INVENTOR
ALEX TUMA

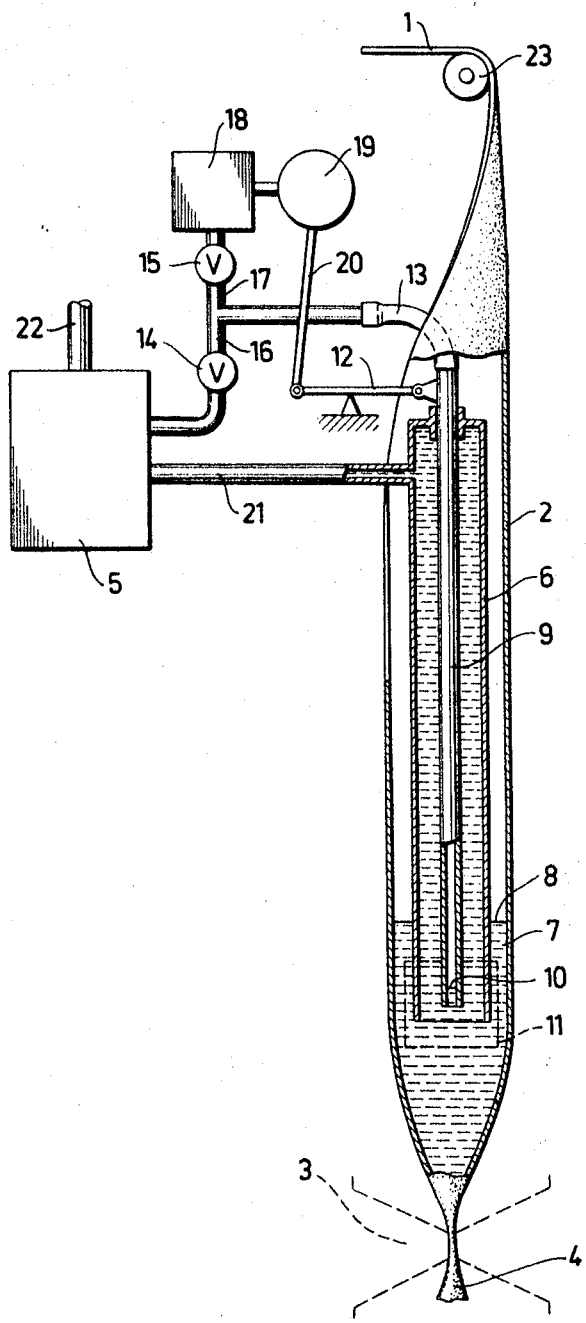

July 29, 1969

A. TUMA 3,457,968

METHOD OF ESTABLISHING AND MAINTAINING
ASEPSIS IN PACKAGING MACHINES

Filed Jan. 26, 1966

INVENTOR
ALEX TUMA

BY Earle R. Marden

ATTORNEY

INVENTOR
ALEX TUMA

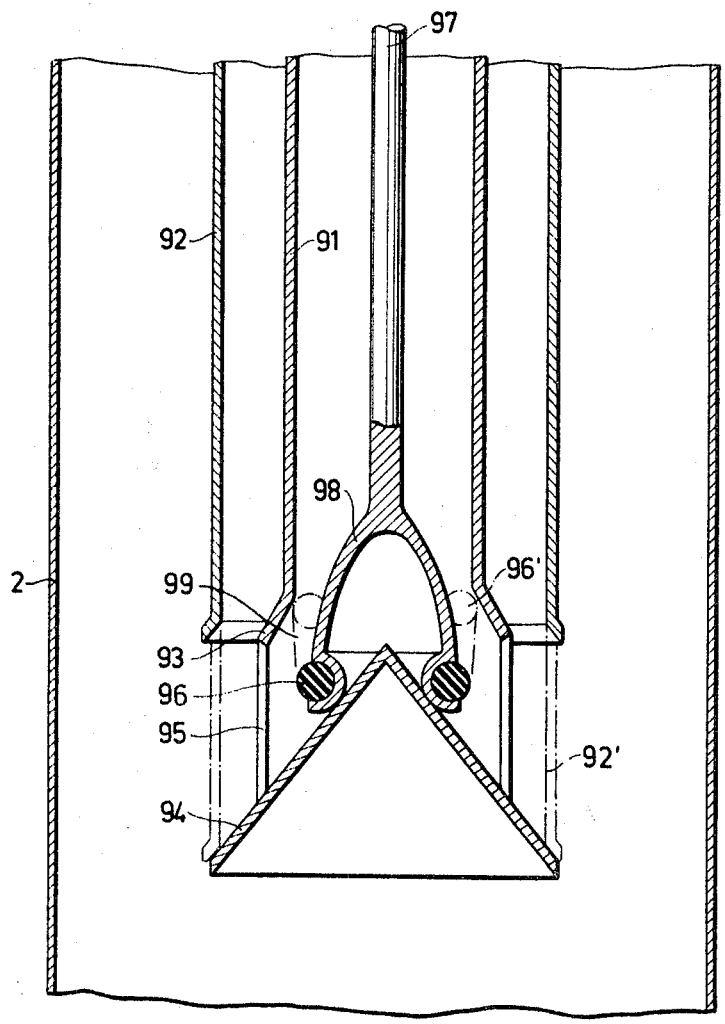

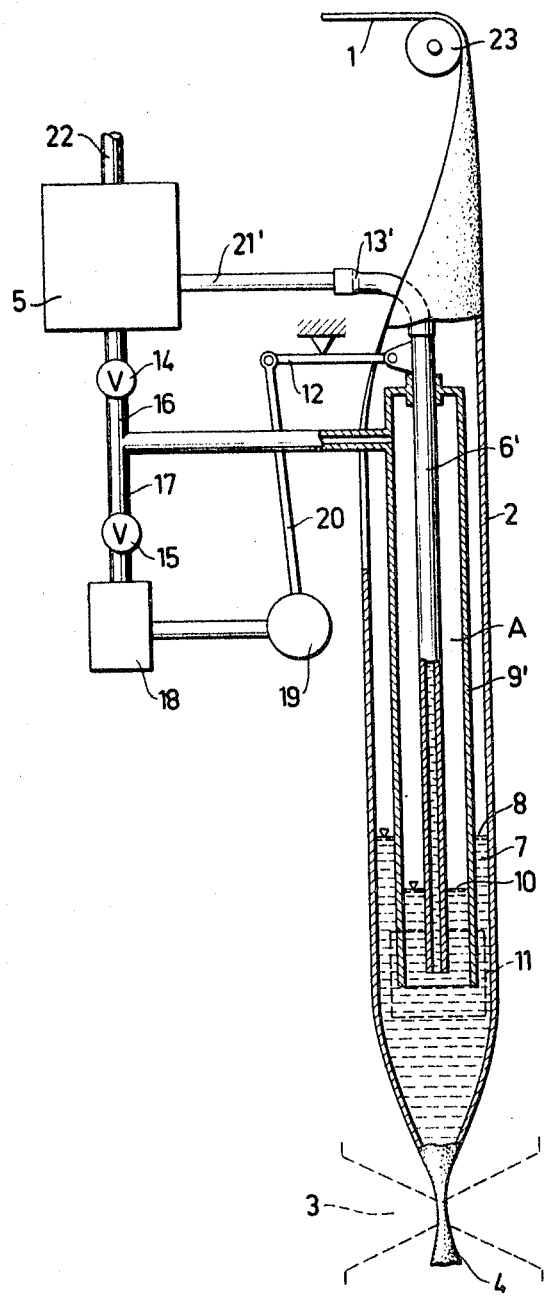

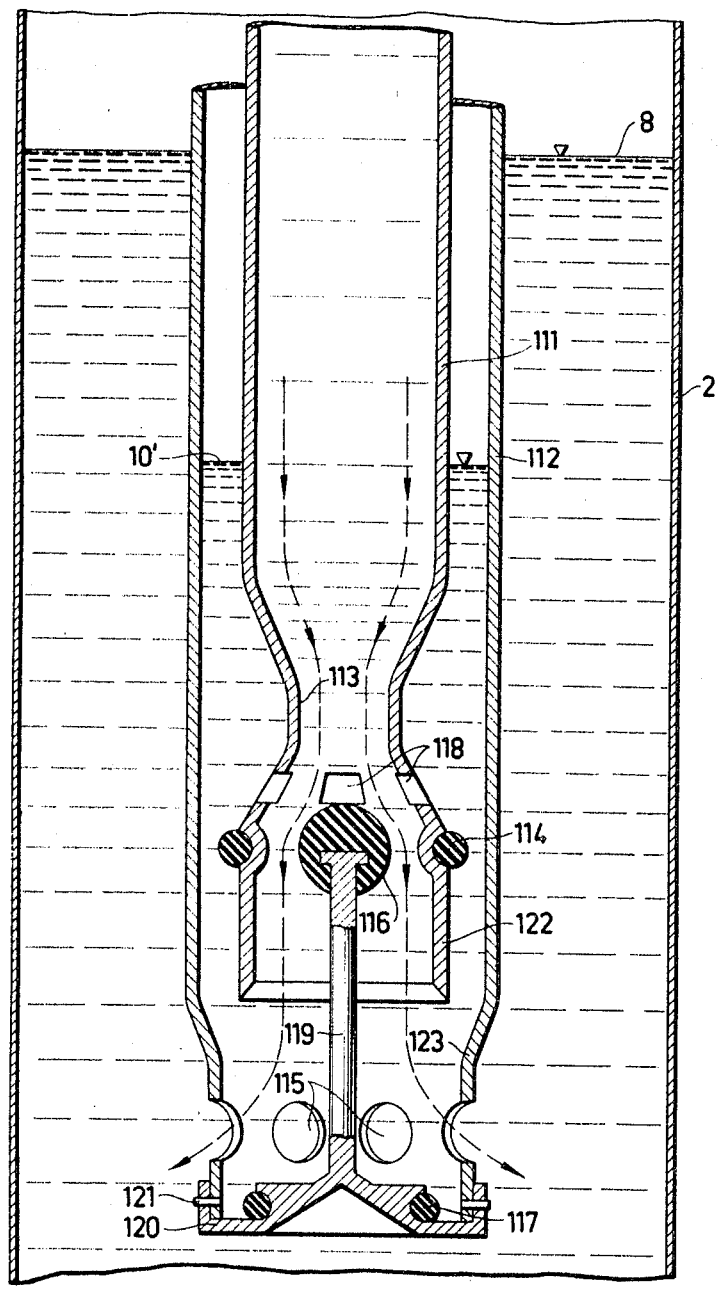

INVENTOR
ALEX TUMA

BY Earle R Marden
ATTORNEY

July 29, 1969
A. TUMA
3,457,968
METHOD OF ESTABLISHING AND MAINTAINING
ASEPSIS IN PACKAGING MACHINES
Filed Jan. 26, 1966
12 Sheets-Sheet 12
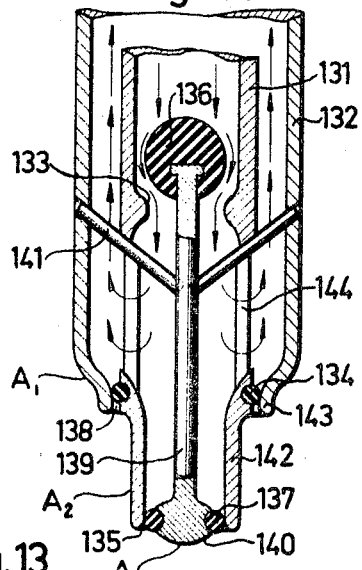
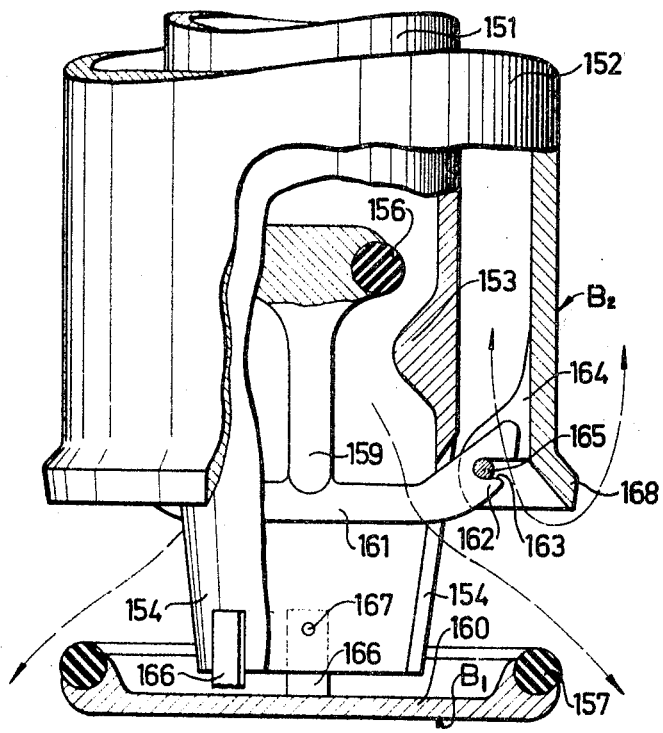
INVENTOR
ALEX TUMA
BY
Earle R. Marden
ATTORNEY

United States Patent Office 3,457,968
Patented July 29, 1969

3,457,968
METHOD OF ESTABLISHING AND MAINTAINING ASEPSIS IN PACKAGING MACHINES
Alex Tuma, Loddekopinge, Sweden, assignor to AB Tetra Pak, Lund, Sweden, a company of Sweden
Filed Jan. 26, 1966, Ser. No. 523,218
Claims priority, application Sweden, Jan. 27, 1965, 1,141/65; Aug. 10, 1965, 10,421/65; Nov. 5, 1965, 14,318/65
Int. Cl. B65b *1/02, 1/04*
U.S. Cl. 141—1                                 10 Claims

ABSTRACT OF THE DISCLOSURE

Method and apparatus to establish and maintain aseptic conditions in a sterile packaging machine by providing a valve system which cooperates with a level sensing tube to control the level of liquid in the system and to recirculate sterile products in the system upon shut down of the system.

---

The present invention refers to packaging and is directed to a method of establishing asepsis in packaging machines of the kind in which a packaging web material is formed into a tube, the tube being at least partially filled with a sterile filling liquid and divided into closed packages; and of maintaining the asepsis during normal operation as well as interruptions of the packaging operation.

In packaging more particularly in packaging products having environments suitable for bacteria for example milk the tendency has been growing to attach greater and greater importance to an absolutely sterile packaging method. A plurality of methods for producing good asepsis in connection with the packaging of such products have therefore been suggested. Similarly, methods for the aseptic control of the level of filling material within the tube have been proposed such as a loose float being disposed in the tube. The control has not become efficient, however, and the method has also caused great difficulties in maintaining the asepsis. After an interruption of operation it has thus been necessary to resterilize the machine, which naturally is a great disadvantage, since this takes a considerable time, during which the plant cannot be utilized for its purpose.

A solution of the problem is circulation sterilization in the case of an interruption of the operation, i.e. the filling material is caused to circulate continually from and to the supply of sterile filling material. In this connection one has tried to solve the problem by keeping a valve outside the tube sterile by a circulation method. At the same time one has introduced a second sterlization medium into the filling pipe e.g. sterile air from said outer valve on to the terminal of said filling pipe. Thus, one has to work with two sterilization media, which of course complicates the method and makes it more sensible to disturbances, which jeopardizes the asepsis. Further said valve has only been able to open and to stop supply of filling material, while the level control has been provided for within a limited range of operation by a loose float on the surface of the filling liquid in the tube.

In order to eliminate these drawbacks, the present invention therefore refers to a new and advantageous method of establishing asepsis in packaging machines of the kind in which a packaging web material is formed into a tube, the tube being at least partially filled with a sterile filling liquid and divided into closed packages; and of maintaining the asepsis during normal operation as well as interruptions of the packaging operation, characterized by the fact that the filling liquid is supplied to the tube through a filling pipe arranged in said tube, the filling pipe being movable in relation to a second pipe arranged in the tube, or the pipes being movable in relation to a third member that may be provided in the tube, the supply of liquid filling material to the tube being shut off in at least one of the mutual positions of the pipes, or positions relative to the third member while the liquid filling material or a sterilizaiton agent is allowed to circulate from the supply of sterile filling material or sterilization agent through the filling pipe and the said second pipe back to the supply or source of filling liquid or sterilization agent or to an outlet.

Further, in order aseptically to control the amount of filling material supplied to the tube, the method according to the invention is characterized by the fact that, in the mutual position of the pipes in which liquid filling material is being suppled to the tube, the air pressure above the liquid surface in the said second pipe, the level pipe, is felt in order to be compared with the air pressure within the tube thereby to provide a measure of the difference between the liquid levels of the tube and the level pipe.

The invention also refers to an apparatus for carrying out the method, the apparatus being characterized by a filling pipe for supplying filling material to the tube or sterilization agent to means disposed in the tube; and a second pipe for removing the sterilization agent and, for the case when the supply of filling material to the tube is temporarily shut off, for bringing the sterile liquid filling material back to a supply or to an outlet; and means provided in and/or on portions of the pipes submerged in the tube, said means operating as a valve which in response to the mutual positions of the pipes, or to the positions of the pipes relative to a third member that may be disposed in the tube, is able to adopt at least three characteristic operative positions; viz. a closed position, the filling pipe being completely shut off at its lower portion; an open position in which communications between the filling pipe, the tube and said second pipe are open; and a circulation position, in which the communications between said two pipes and said tube are shut off, while at least one passage between the lower portions of the two pipes is open.

The lower portions of the two pipes are according to the invention given a special shape, whereby the positions of the pipes to each other relative determine a possible communication between the pipes themselves, on one hand, and with the environment on the other hand. According to the invention, the pipes may also be provided, at their lower portions, with suitable auxiliary means e.g. valves. Whether the operation is carried out by means of specially formed pipe details or with said auxiliary means in principle an equal valve action can be obtained, which is characterized by three characteristic positions. One operative position is adopted by the valve when the supply of filling material to the tube is completely free and a second one when the supply is shut off. Between these two positions the supply takes place in response to a desired distance-liquid diagram, one pipe at the same time serving as a level detector. In a third operative position the pipes are in communication with each other, while the supply of liquid to the environment is shut off and the liquid filling material or sterilization agent circulates from a supply, e.g. a sterilizer, via the two pipes back to the supply or to an outlet.

Further characteristics of the invention will be apparent from the following examples of construction which will be described in connection with the accompanying drawings, in which:

FIG. 1 illustrates the principle of the invention,

FIGS. 2a–c show different distance-liquid diagrams,

FIGS. 3a–c show three different operative positions of a valve device intended to be employed for carrying out the method according to the invention, FIG. 4 comprises a section of FIG. 3b.

FIGS. 5–9 show further valve devices according to the invention,

FIG. 10 shows an apparatus in which the level pipe surrounds the filling pipe,

FIG. 11 shows a valve device intended to be used in combination with the apparatus according to FIG. 10, FIGS. 12a–c show another embodiment of the valve means according to the invention and adapted to be used in the apparatus shown in FIG. 10, and FIG. 13 shows a third embodiment of a valve means intended to be provided in the packaging apparatus schematically shown in FIG. 10.

Figure 2C:
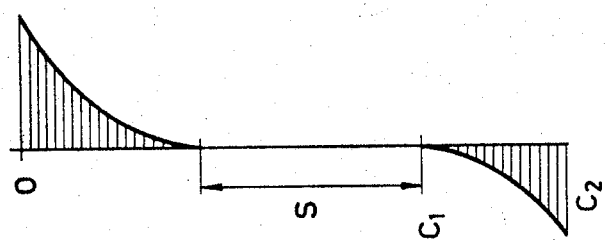

According to FIG. 1, the packaging web material 1 is brought over a turning roll 23 and is formed by means of tube forming means, not shown, into a tube 2. The tube which is partly filled with a filling liquid material 7 is formed by special means 3 into closed packages 4, which are detached and removed. The filling material is supplied to a sterilizer 5 through conduits 22. In the sterilizer the filling material which may consist for example of milk is sterilized and is passed through a conduit 21 to the filling pipe 6 which terminates into the lower part of the tube 2. It is also possible to feed sterile filling material to the member 5 which in this case might be called a sterile filling material supply. The member 5 also comprises means for feeding a sterilizing agent through the filling system when the asepsis is to be established or when the machine is to be re-sterilized after a contamination.

It is desired constantly to keep a certain pre-determined amount of sterile filling material 7 in the tube. The problem to be solved by the device is, accordingly, first to produce sterility of the filling means, second to maintain sterility of the filling material and third to keep the upper surface 8 of the amount of liquid 7 at a constant level. In order to realize this a second pipe 9 has been arranged in the tube 2, which like the filling pipe 6 terminates into the lower part of the tube. This second pipe 9 is referred to as "level pipe" in the following. The lower portions of the pipes 6 and 9 are conveniently formed in a special way. In FIG. 1 this has been illustrated by dash lines 11. The pipes 6 and 9 may be allowed to communicate with each other, whereby the liquid 7 rises a certain distance in the pipe 9 to a level 10. This level 10 is not necessarily situated at the same height as the filling material level 8, as an inner pressure is maintained in the pipe 9 above the level 10.

A raising of the filling material level 8 within the tube will cause a raising of the level 10. Thereby the pressure is increased in the level pipe 9, the pipe defining a closed volume above the level 10, said pressure actuating a pressure sensing means 18 through the conduit 17 and the open valve 15. The pressure sensing means 18 in turn actuates a torque producing member 19 which through torque transmission means 20 and 12 causes a relative change of position of the pipes 6 and 9. Alternatively a third member, e.g. a valve spindle, may also be provided in the tube, the valve spindle being operated by the torque transmission means 20 and 12 so as to adopt a desired position in relation to the pipes 6 and 9.

If the packaging machine for some reason must be stopped for a relatively short or a longer time, the asepsis may nevertheless be maintained or re-established according to the invention. This is realized by shutting off the supply of filling material to the tube by a relative change of position of the pipes 6 and 9 or of the third member that may be provided as above mentioned. Simultaneously the valve 14 is opened and the valve 15 is closed, whereby the filling material is allowed to rise in the level pipe 9 and further up through the tube 13 and the conduit 16 back to the supply member 5. The filling material will thus, at least at a short stoppage of operation, circulate from the sterilizer via the pipes 6 and 9 back to the member 5. Thereby both the filling pipe and the level sensing means, i.e. the level pipe, will be maintained sterile during the whole stoppage of operation, whereby no re-sterilization is necessary at the re-starting of the machine.

If a stoppage of any longer duration would occur or if the asepsis would have been lost for some reason, this may be re-established in a simple way according to the invention, the supply of filling material being replaced by a supply of a sterilization agent, e.g. hot steam or a sterilizing solution such as $H_2O_2$, and the pipes being displaced or turned to the position of circulation, whereby the whole equipment may be sterilized by circulation of the sterilization agent from a supply; through the two pipes and the valve means 11 back to the supply. In FIG. 1 also the sterilizing agent supply means has been indicated by the member 5.

In FIG. 1 the principles of the invention have been shown only diagrammatically. In the following it will be shown how the lower portion 11 of the pipes 6 and 9 may be constructed. No detailed description of the member 5 which, among other means, may comprise a sterilizer and/or a pump for feeding packaging liquid or a sterilizing agent; the valves 14 and 15; the pressure sensing member 18; or the control and torque transmission members 19, 20 and 12 will, however, be required, since these are intended to consist of generally well-known details.

Figure 2B:
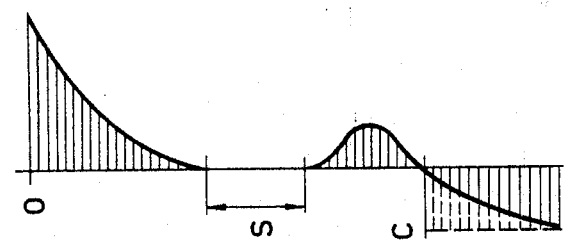
Figure 2A:
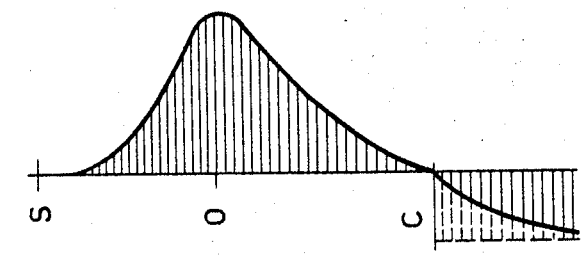

As has been mentioned, the pipes are intended to be displaced or turned in relation to each other for obtaining a valve action, which is characterized by the three above-mentioned characteristic operative positions. FIGS. 2a–c are intended to illustrate these positions, the curve portions to the right of the axis of ordinates referring to liquid which is supplied to the tube, while those to the left refer to liquid which circulates in the way above mentioned.

Thus, FIG. 2a shows a distance-liquid diagram in which S and O designate the two characteristic operative positions in which the valve 11 is completely closed or shut, i.e. when no liquid at all is moving, and completely open, respectively, in which latter case a maximum amount of liquid per unit of time is supplied to the package tube. Between these two operative positions the liquid supply responds to the curve shown in the figure.

The various positions are obtained by sliding or turning the pipes. Hence, starting from position S position O may be obtained by sliding for example the level pipe, while the filling pipe is stationary. If the level pipe is caused to slide further, the supply of liquid to the tube decreases to cease entirely, when position C has been reached. In this position, the circulation position, the valve 14 in FIG. 1 being open, the filling liquid or, in the case when the apparatus is to be sterilized, the sterilizing unit will instead circulate from the supply member 5 through the filling pipe and further on via the valve defined by the lower portions 11 of the pipes, through the level pipe back to the supply member or to an outlet. Of course, the filling pipe may be slidable instead of the level pipe, in which case the latter is stationary, and similarly a turning may be contemplated instead of a sliding movement. The necessary stipulation is only a relative change of position and a suitable design of the valve defining portions 11 of the pipes.

However, a valve which operates according to the distance-liquid diagram shown in FIG. 2a is impaired by characteristics which in most cases must be considered as serious drawbacks. In order to adopt the circulation position C it is thus necessary, starting from position S, first to pass position O, i.e. the position in which the maxmum amount of liquid is supplied to the tube per unit of time. It cannot be avoided a certain amount of liquid being supplied to the package tube which is not always desirable. A valve operating according to the diagram shown in FIG. 2b therefore constitutes an improvement in this respect. In this diagram position O and position C define two end positions while position S is situated between these two. From closed position S to the circulation position C one is thus not compelled to pass the wholly open position O, which may be an advantage in many cases. In order that the said circulation may take place it is of course assumed that the valve 14 has been opened, which may occur simultaneously with the displacement of the pipes to the circulation position.

The valve structure which in most cases is the most favourable one, however, operates according to diagram 2c. Between the completely closed position S of the valve and the circulation positions $C_1$–$C_2$ thereof, the supply of liquid filling material to the environment, i.e. the tube, is interrupted all the time. Furthermore, the amount of circulating medium is adjustable, which is illustrated by the curve between the positions $C_1$–$C_2$.

Figure 3A:
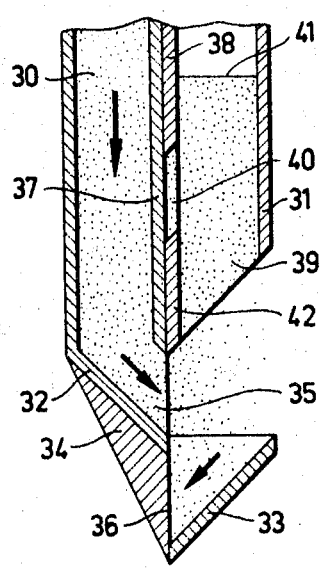
Figure 3B:
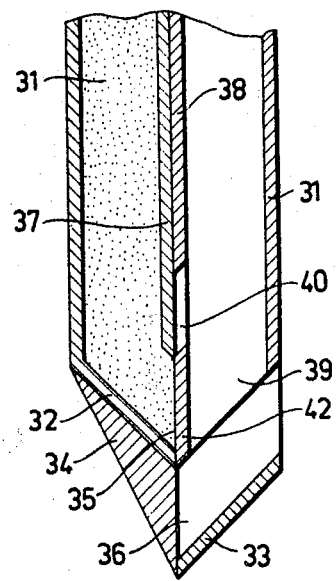
Figure 3C:
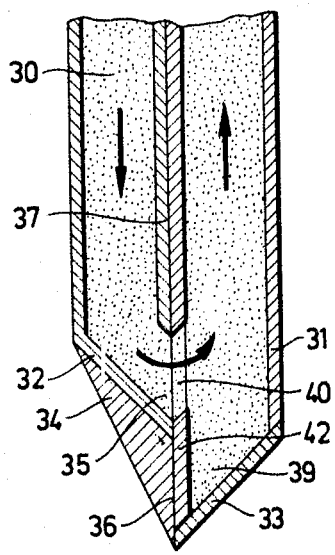
Figure 4:
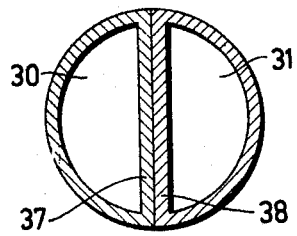

FIGS. 3a–c show a shaping of the lower portions of the pipes, according to which a diagram substantially in accordance with FIG. 2b may be utilized. In this case the left pipe 30 is intended to serve as a filling pipe and the right pipe 31 as a level pipe. The pipes have a semicylindrical section through the main of there length. The pipe 30, the filling pipe, has such a form at its lower portion that it presents an oblique wall 32 and a semicone 33, the semicone 33 being provided with a stay 34. The filling pipe 30 has a first aperture 35 between the oblique wall 32 and the flat pipe wall 38 and a second aperture 36 between the outer semicone 33 and the oblique wall 32. The level pipe 31 is bevelled at its lower portion, the bevel angles being equal to the angles which the oblique wall 33 forms with the axis of symmetry of the apparatus. In the bevel section the level pipe 31 has an aperture 39. Said pipe also has an aperture 40 in its flat wall 38. This aperture 40 has a size equal to the size of the first aperture 35 of the filling pipe 30.

FIG. 3a shows the position in which the supply of filling material to the tube is completely free, i.e. corresponding to position O in diagram 2b. The filling liquid (or sterilizing agent) flows through the filling pipe 30 in the direction of the arrows through the apertures 35 and 36 out into the surrounding tube, which is not shown in FIGS. 3a–c. Further, in normal packaging operation, the liquid rises in the level pipe 31 up to a level 41 which is determined by the liquid level in the tube and by the air pressure above the surface 41 in the way stated with reference to FIG. 1. The size of the apertures 35 and thereby also the amount of supplied liquid is controlled by sensing the pressure above the level 41, said pressure causing by torque transmission members, in the manner earlier mentioned, a relative change of position of the pipes 30 and 31. If for instance the level pipe 31 is displaced downwards the lower portion 42 of the flat wall 38 of the pipe 31 will completely or partly cover the aperture 35. When said portion partly covers the aperture 35 the regulating system is defined by a portion between O and S in diagram 2b. In FIG. 3b position S has been reached. The portion 42 then completely covers the aperture 35, and therefore the filling pipe does not communicate either with the environment or with the level pipe 31. If the level pipe 31 is displaced further downwards, a communication will be opened between the level pipe and the filling pipe through the aperture 40. A certain amount of liquid escapes to the environment, but the maximum flow of liquid to the tube is not reached. When the pipe 31 engages the cone 33 the aperture will be completely blocked by the portion 42. The communication between the filling pipe 30 and the level pipe 31 is, however, quite free, and by opening the valve 14 in FIG. 1 the filling liquid or sterilizing agent is allowed to circulate in the way mentioned. A control of the circulation amount of filling liquid or sterilization agent may be obtained in all the constructions described by a suitable design of the valve 14, which has been indicated by the curves to the left of the axis of ordinates in the diagrams 2a and 2b.

The device may also be modified so as to be able to operate according to diagram 2c by extending the portion 42 of the right pipe below the aperture 40 a certain distance downwards corresponding to the aperture 36 and providing the semicone 33 with a slit in its left portion, the slit having such a size that it may receive the lower extension of the portion 42.

Figure 5:
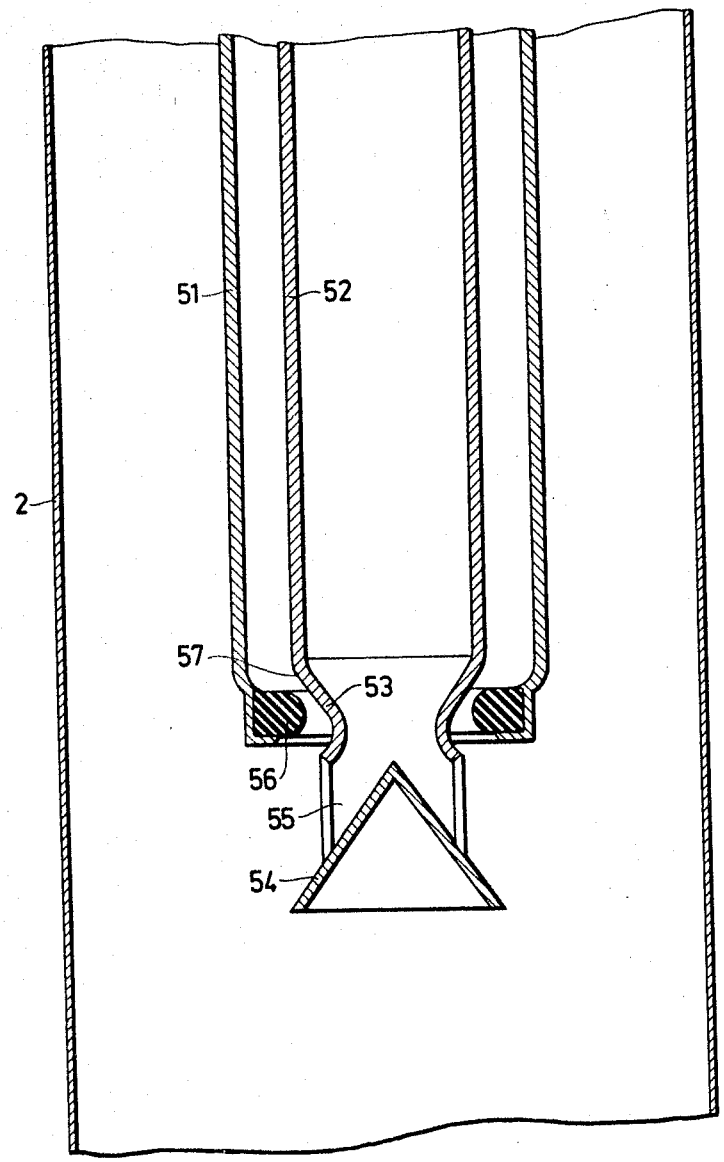

FIG. 5 shows another embodiment of the valve structure. The filling pipe 51 and the level pipe 52 are coaxial according to this embodiment. The surrounding tube 2 is also shown in the figure. The lower portion 53 of the level pipe is formed in a certain way for reasons having relation to the flowing technique. This shaping also permits attainment of the three characteristic operative positions. The position shown in FIG. 5 corresponds to position O in FIG. 2a. By displacing the level pipe upwards or the filling pipe downwards the rubber packing 56 will tightly engage the level pipe approximately at the point 57, the position S being reached, i.e. the supply of filling material being completely shut off. If, instead, the displacement takes place in the opposite direction, the cone 54 which is attached to the level pipe 52 by means of stays 55, will engage said rubber packing 56. Position C in FIG. 2a then has been reached, and the circulation may begin.

Figure 6:
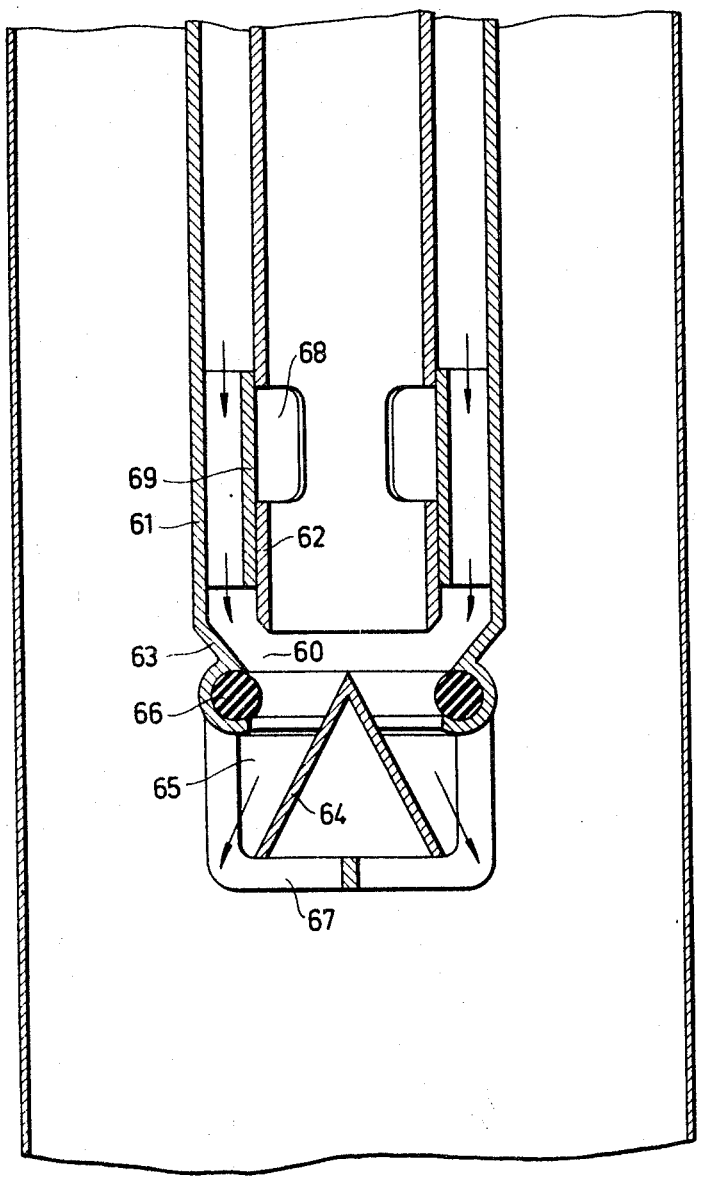

Also a valve according to FIG. 6 consists of two coaxial pipes, a filling pipe 61 and a level pipe 62. The valve means operates according to diagram 2b and is completely open in the position shown in the figure. It is like the valve means according to FIG. 5 provided with a rubber packing 66, a portion 63 shaped in a particular way for reasons of flowing technique and a cone 64 which, however, as distinguished from the cone 54 in FIG. 5 is attached by stays 67 to the filling pipe. Within the filling pipe 61, coaxially with and attached to the latter, a piece of a pipe or a ring 69 is provided. The level pipe is movable in said ring 69 and is provided at its lower part with a number of apertures 68.

As already mentioned, the valve operates according to diagram 2b and has in the position shown in the figure taken up position O, i.e. the communication to the environment being completely open. By moving the level pipe 62 downwards, the aperture 60 and thereby the liquid supply to the environment, i.e. the tube, will be throttled and completely shut off when the lowermost portion of the level pipe tightens against the rubber packing 66. Position S in diagram 2b has then been reached.

If the relative movement is continued the passage 60 will gradually be opened by the apertures 68 of the level pipe. Simultaneously the connection 65 with the tube 2 is throttled and will be completely shut off, when the level pipe has attained an engagement to the cone 64, position C. If now the valve 14 is open, liquid may be fed down through the filling pipe 61 and, via the apertures 68, through the level pipe 62 back to the liquid supply.

What with reference to the previous embodiments has been said about the sterilizing agent and the working conditions of the apparatus in the case when a sterilizing agent is fed to and/or through the system of course is adaptable also in the embodiment according to FIG. 6. This also concerns the following embodiments even if this in each case is not specially pointed out.

Figure 7:
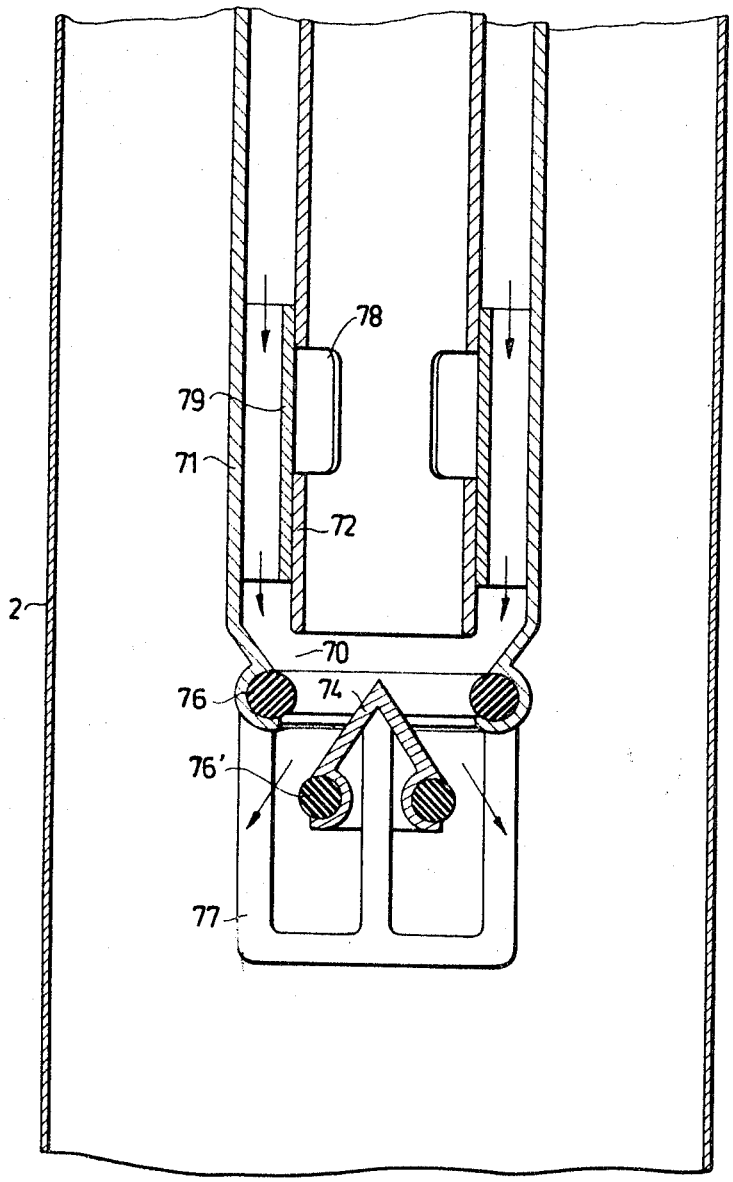

FIG. 7 shows a modified version of the valve according to FIG. 6, functional difference consisting in the fact that the valve may operate according to diagram 2c. In the figure the reference numerals have been chosen so that the second digit is the same as used for the corresponding details in FIG. 6. The greatest difference between the two valves is a rubber packing 76 which has beeen mounted on the cone 74 which has been made slightly smaller. Further, the stay 77 supporting the cone 74 has been made longer. Similarly, the ring 79 and the lower part of the level pipe 72 have been extended.

When throttling the liquid supply from completely opened, position O, to completely shut off, position S, the two valves present no functional difference, see diagrams 2b and c. When the relative movement of the level pipe 72 extends beyond the rubber packing 75, the aperture 70 will, however, still be closed and will remain so until the level pipe has arrived at the lower rubber packing 76. Position $C_1$ of the diagram has then been reached.

If the valve 14 now is opened and the relative movement of the level pipe is continued, a connection is created between the filling and level pipes through the apertures 78. The amount of circulating liquid follows the lower curve in diagram 2c, the maximum circulating amount of liquid or, in the case of cleaning the machine, sterilization agent per unit of time being obtained, as the apertures 78 are situated between the lower edge of the level pipe 72 and the rubber packing 76, i.e. when position $C_2$ in the diagram has been reached.

As already mentioned the object of the invention is to provide an aseptic packaging method. A demand for this is of course that all the details which conceivably can come into contact, directly or indirectly, with the filling material are quite sterile. In order to facilitate the sterility it is therefore desirable that all details shall be easy to clean. Thus, FIG. 8 shows a valve structure which is easy to take apart for cleaning.

Similarly to the earlier valves, the device consists of a filling pipe 81 and a level pipe 82 coaxial with the former. Further, there are two rubber packings 86 and 86' which are associated with the level pipe 82. The upper packing 86 is permanently mounted on the level pipe while the lower packing 86' is mounted on a plate 87 detachable from the level pipe 82. The connection between the plate 87 and the level pipe 82 consists of a tubular portion 84 provided with apertures 88. The tubular portion 84 is fastened to the level pipe 82 by means of a U-shaped spring (see FIG. 8a), the locking pins of which are inserted in the through apertures 85.

Figure 8:
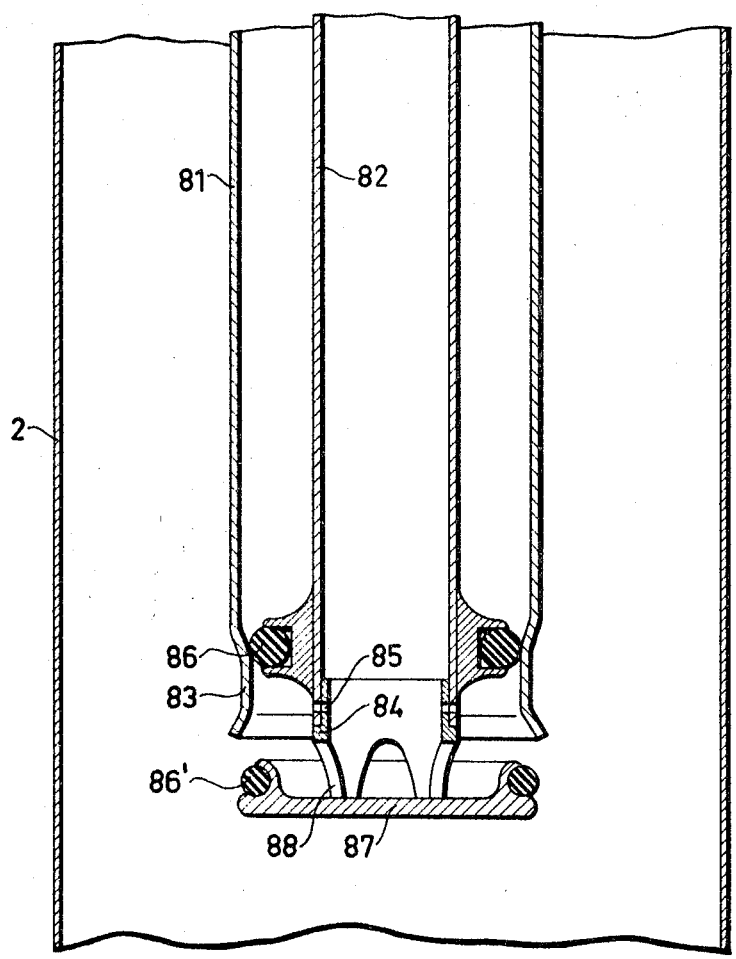
Figure 8A:

The valve operates according to diagram 2b and has assumed, according to FIG. 8, position S in the diagram. Position O will be reached by moving the filling pipe 81 upwards or the level pipe 82 downwards. On the contrary moving the filling pipe downwards or the level pipe 82 upwards so that the lower rubber packing 86 will tighten, position C is reached, the inturned part 83 of the filling pipe then engaging said packing. The communication between the filling pipe and the level pipe then takes place through the aperture 88.

FIG. 9 is intended to show how the two pipes, the filling pipe and the level pipe, may be combined with a third means, a valve spindle. As distinguished from the other embodiments having coaxial pipes as shown, in this case the inner pipe 91 constitutes the filling pipe, while the outer pipe 92 serves as the level pipe. Within the filling pipe there is provided a valve spindle 97, the lower part of which has a bell-shaped formation 98 which is provided with a rubber packing 96. The filling pipe 91 is flared in its lower part 93 and is rigidly connected with a cone 94 through stays 96. The three means, i.e. the filling pipe, the level pipe and the valve spindle are movable in relation to each other. However, for the sake of simplicity it will be advantageous to imagine the filling pipe 91 with the cone 94 thereof as stationary and the other members as movable in relation thereto.

In the position shown in the figure the connection 99 between the filling pipe and the environment (the tube) is wholly open, i.e. position O in diagram 2c. By moving the valve spindle 97 upwards this connection is throttled so as to be completely shut off when the rubber packing engages the lower part 93 of the filling pipe, said position being indicated by dash lines and designated by 96'. Position S in the diagram then has been reached. The level pipe 92 is now displaced downwards towards the cone 94 and when position 92' has been taken up, position $C_1$ in the diagram has been reached. The circulation valve 14 is now opened and the valve spindle is again moved downwards, said movement corresponding to the curve between $C_1$ and $C_2$ in diagram 2c. When the valve spindle has come down to the cone 94, the maximum amount of filling liquid or sterilization agent circulates through the system, i.e. circulation position $C_2$ has been reached.

The embodiment shown in FIG. 9 allows several combinations for opening and closing the communications between the filling or level pipe, respectively, and the tube. The points S, O and C therefore are not bound in any definite order as is shown in the diagrams. In return a device divided into three different parts involves other problems difficult to solve as compared with one divided into two parts only.

In packaging machines of the kind which is schematically shown in FIG. 1, i.e. machines having an interior level pipe and an outer filling pipe arranged around the level pipe, formation of condensate on the outer surface of the filling pipe has in the case when the filling material consists of a refrigerated liquid created a serious problem, as microorganisms that may occur within the packaging machine can be absorbed by the condensation liquid and run down along the filling pipe down into the filling liquid.

The embodiment according to FIG. 10 intends to eliminate this drawback and is characterized by an interior filling pipe and an outer level pipe arranged around the filling pipe, the level pipe in the case of level regulation being filled with a filling liquid up to a certain level and above this level by a gas, preferably air, which in the case when the filling liquid is rather cold serves as an insulation thereby to prevent formation of condensate on the outer surface of the outer pipe.

How the machine is intended to operate should be apparent from the figure, the machine in its principles not differing from the machine according to FIG. 1. The valve means may be of the kind described with reference to FIG. 9, i.e. containing a third member, viz. a valve spindle. From reasons mentioned above it is however desirable to avoid such third member. FIG. 11 therefore shows a valve means adapted to be used in connection with the packaging machine according to FIG. 10 and containing no additional valve actuating means such as a valve spindle or the like.

In FIG. 11 the filling pipe has been designated 111 and the level pipe 112. The filling pipe has a constriction 113 and a packing ring 114 made from rubber between the constriction 113 and a lower portion 122 of the filling pipe. Further, a number of apertures 118 has been provided in that portion of the filling pipe which is situated between the constriction 113 and the packing ring 114.

Also the level pipe shows a constriction, which has been designated 123 and a number of apertures 115 in the pipe wall in the region of the constriction 123.

Further, the apparatus is provided with a bottom plate 120 attached to the level pipe 112 by means of a pair of pins 121. The bottom plate on one hand supports a packing ring 117 of the same kind as the packing ring 114 but with somewhat smaller diameter, and on the other hand a pillar 119 supporting a ball 116 preferably made from rubber or a similar flexible material.

In the position shown in the figure the passage between the filling pipe 111 and the interior of the tube 2 is completely open. The filling material hereby follows the path indicated by dash lines. Simultaneously a certain filling liquid level 10' will arise when the level pipe 112, or more exactly, in the space between the level pipe 112 and the filling pipe 111. Above the level 10' is the volume of air, the pressure of which will form a value of the amount of the present level 8 of the filling material in the tube 2, said air volume also serving as a thermal insulation A, FIG. 10, of the filling pipe 111.

The supply of filling material to the tube 2 is shut off by lowering the filling pipe 111 so that the ball 116 will tightly engage the inside surface of the filling pipe 111 in the region of the constriction 113 of said pipe. If the movement of the filling pipe is continued downwards so that the lower portion 122 of said pipe will tightly engage the lower packing ring 117, a passage between the filling pipe and the level pipe will be re-opened. This passage is made possible by the apertures 118. On the other hand the connection between the environment and the pipe interiors is shut off by the packing rings 114 and 117 which sealingly engage the constrictions 123 of the level pipe and the lower portion 122 of the filling pipe, respectively.

When the apparatus is to be sterilized the filling pipe thus is being lowered to the position mentioned, whereupon a hot water steam or any other suitable sterilizing agent is fed through the system. In the case of short breakages of operation this possibility of circulation might also be utilized for bringing the filling liquid back to the filling liquid supply via the level pipe 112.

Figure 12A:
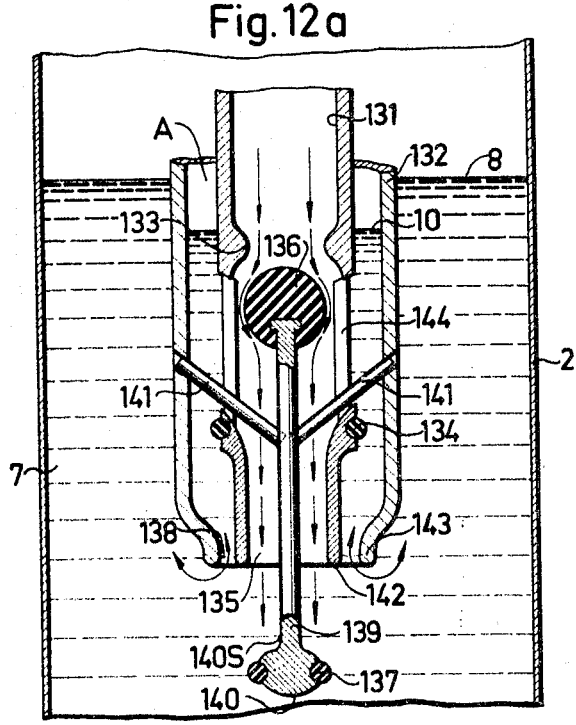
Figure 12B:
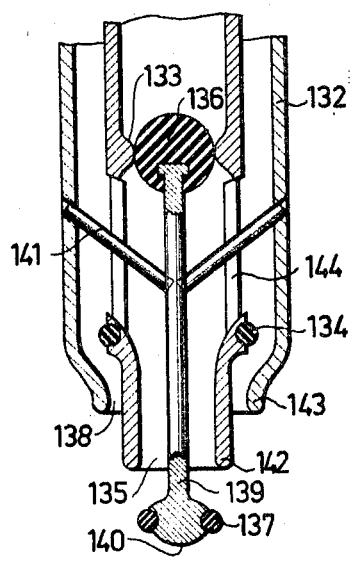

FIGS. 12a–c describe another valve means intended to be used for the packaging machine according to FIG. 10. In the figures, FIG. 12a illustrates a position that the valve means is intended to adopt when the filling liquid is being supplied to the interior of the tube 2. Here as well the passage 135 between the interior of the filling pipe 131 and the tube 2 as the passage 138 between the tube and the level pipe 132 are completely open in order to render it possible to supply a filling liquid (or a sterilizing agent) to the tube and to control the filling liquid level 8 by means of the level pipe 132.

According to FIG. 12b the level pipe 132 and the filling pipe 131 have been displaced relative to each other, either by displacing the level pipe 132 or by displacing the filling pipe 131 or by displacing both of them, so that the passage between the filling pipe interior and the environment has been completely shut off. In the region between the completely open position according to FIG. 12a and the completely shut off position according to FIG. 12b, the valve means might adopt a position which is most suitable for the present liquid supply required, the displacements being carried out by means principally shown in FIG. 1 and FIG. 10, said means being controlled by the air pressure above the level 10' within the level pipe.

The sealing of the closed valve, as in FIG. 12b, is provided by a ball 136 or ring made from rubber or another flexible material, which is caused to tightly engage an annular bulge 133 of the inside surface of the filling pipe 131. When the valve means adopts a position between the completely closed, as in FIG. 12a, and the completely shut off position, as in FIG. 12b, the ball 136 and the bulge 133 further define a passage for the filling material (or for the sterilizing agent), the cross section area of the passage defining the quantity of filling liquid or sterilizing agent supplied per unit of time.

The ball 136 is supported by a pillar 139, the upper portion of which is suitably molded in the ball, as is apparent from the figures. The pillar 139 merges in its lower portion into a base 140. The mergence between pillar and base occurs smoothly and without any angles. The mergence-area has been designated 140S in FIG. 12a and shows a smooth nature, which is of importance in those cases when the filling liquid consists of an easily foaming liquid such as for instance cream.

The pillar 139 which supports the ball 136 is in its turn supported by a number of pins 141 (according to the present embodiment four pins) which are fastened in the wall of the filling pipe 131. These apertures or slots 144 serve, besides to make it possible to attach the pillar 139 to the outer level pipe 132, also to provide the passage between the filling pipe 131 and the level pipe 132 which is necessary in the position of circulation.

When the working position of the valve is to be changed, the two pipes are moved relative to each other. If for instance, the inner filling pipe 131 is stationary relative to the environment and the level pipe 132 is arranged slidable—the reverse condition of course might be the case—thus the level pipe 132 is moved a distance downwards from the completely open, FIG. 12a, to the completely closed position, FIG. 12b, so that the ball 136 will tightly engage the bulge 133. In this movement the following details take part: the level pipe 132 in its entirety, the pins 141; and the pillar 139 with its base 140 and the ball 136. If it is desired to bring the valve to the position of circulation, FIG. 12c, the movement is continued till one has got a complete tightening action between the tightening means provided for this purpose.

The tightening means that are utilized in the position of circulation, FIG. 12c, consist of a packing ring 137 made of rubber or another flexible material and being arranged around the base 140 in order to co-operate with the lower portion 142 of the filling pipe 131; and a second packing ring 134 which likewise is made of rubber or an other flexible material and arranged immediately below the apertures 144 and around the outside surface of the filling pipe 131 to co-operate with the lower portion 143 of the level pipe 132.

When the valve has adopted the position of circulation, FIG. 12c, the tightening action is provided by the details above mentioned, at the same time as the communications 144 between the filling pipe 131 and the level pipe 132 are open. Hereby the filling liquid, or the sterilizing agent, may be fed through the two pipes with normal or reduced capacity, the filling liquid or sterilizing medium being fed from the member 5, FIG. 10; through the filling pipe 131; through the valve means, which in FIG. 10 generally has been designated 11, said liquid of medium thereby passing the slots or apertures 144; and via the level pipe 132 back to the supply 5, whereby the asepsis might be maintained during a breakage of operation or the interior of the filling devices might be re-sterilized after having been contaminated.

At certain filling materials the circulated liquid is fed back to the sterilizer, which in these cases might be considered to be comprised in those apparatuses which schematically have been indicated by the member 5, FIG. 10. On the other hand there are filling materials which cannot stand two sterilizing treatments, as impairments of the taste of the filling material might be the result of the second treatment. In accordance with the invention the filling material might in these cases be led away for a continued treatment for other purposes at the same time maintaining the asepsis in the packaging machine. It is also possible in accordance with the invention to feed the filling material, in the position of circulation, through the standstill machine and therefrom to a second machine connected in series with the first one, whereby the sterility in the first machine might be maintained at least in the interior of the filling devices.

During short breakages of operation it is of course also possible, if the interior of the packaging machine is kept absolutely aseptic, simply to shut the connections between the pipes and the environment and to shut off the supply of filling liquid to the filling pipe, FIG. 12c.

If on the other hand the pipes and the valve means 11 are to be sterilized after having been contaminated or when a risk for the sterility having been lost is considered to exist, the valve is likewise brought to take the position shown in FIG. 12c, whereupon a sterilizing agent is fed through the system. The sterilizing agent preferably consists of an overheated steam under an overpressure. Hereby a complete sterility is obtained of all details within the casing defined by the level pipe 132; the lower portion 142 of the filling pipe; and the base 140. Thus, for instance the pillar 139; the ball 136; and the pins 141 are comprised in the volume defined by said casing. Also the inside surfaces of the details defining the said casing are exposed to the action of the sterilizing agent and are included in the conception of "means within the casing."

If the sterility has been lost of course also the outside surfaces of the valve must be sterilized. This is preferably carried out by means of suitable sterilizing or cleaning agents such as overheated water steam and a caustic solution. A demand for a successful treatment, however, is that all surfaces, which cannot come into contact with the interior overheated water steam, are easy to be reached for outside treatment, which preferably is carried out under utilizing the surrounding tube as a "sink." Alternatively or besides, also a manual cleaning operation might be necessary. For this purpose, the outer surfaces of the valve means are designed in a suitable way. As is apparent from FIG. 12c these outer surfaces form the outer surface of the said casing, said surface comprising the outside surface $A_1$ of the lower portion 143 of the level pipe; the outside surface $A_2$ of the lower portion 142 of the filling pipe; and the bottom surface $A_3$ of the base 140. The total surface $A_1$, $A_2$, $A_3$ is easy to attack by means of conventional cleaning and sterilizing methods, which is of great importance above all when a mechanical cleaning operation has to be carried out, i.e. by means of brushes; compressed air; a flowing liquid; or the like.

A demand for a mechanical cleaning of the inner details is that the valve means is easy to take apart. This might, in accordance with this embodiment of the invention, be carried out by the fact that borings are taken up in the level pipe wall, said borings having such diameter that the pins 141 in their main may be brought through said borings. Besides, additional borings intended for the pins are taken up in the pillar 139. Preferably the outer portions of the pins have a somewhat greater diameter and are threaded. Likewise, the borings in the level pipe wall are threaded, so that the pins can be attached in their positions, shown in the figures. It is also possible to thread the inner portions of the pins as well as the borings in the pillar. The threads are not shown in the figures.

When the valve means is to be taken apart, the pins 141 are unscrewed. Hereby the pillar 139 together with the ball 136 will fall down through the lower portion of the filling pipe. The pieces taken out are easy to clean in any conventional way, while the interiors of the tubes, which now are relieved of the additional inside means, might be cleaned by means of suitable brushes or other mechanical means.

FIG. 13 finally, shows another embodiment of the valve means according to the invention. Also in this embodiment there is an interior filling pipe 151 and an outer level pipe 152 having an outside surface $B_2$, the tubes being arranged slidable relative to each other, the position of circulation, however, contrary to the previous embodiment, starting from the completely open position, is reached by a displacement motion of the inner filling pipe 151 upwards relative to the surrounding level pipe 152.

In the lower portion of the filling pipe 151 there is a number of slot-shaped apertures 154 for the filling liquid which in the open position of the valve is discharged in the direction indicated by the dash lines. Said apertures 154 according to this embodiment also serve as a connection between the filling pipe and the level pipe in the position of circulation. The apertures also have one third purpose, which will be apparent from the following.

Below and removably attached to the filling pipe 151 by means of a number of junction means 166, 167 there is a bottom plate 160, which in the position of circulation shuts off the passages between the pipes and their environment. The under-side of the bottom plate is designated $B_1$. The tightening function is carried out by means of a packing ring 157 provided to press against the lower portions 168 of the level pipe 152.

Further, within the filling pipe and slidable relative to this, there is provided a packing ring 156 of rubber or another elastic material, said packing ring being supported by a pillar 159. The pillar 159 is in its turn removably attached to the level pipe 152 by means of stays 161, which go through the apertures 154 in the filling pipe wall. Thus, this constitutes the above mentioned third purpose of the said apertures 154. The end portions 162 of the stays 161 are somewhat bent upwards, as is apparent from the figure, and provided with recesses 163. Hook-shaped means 164 projecting from the level pipe 152 show similar recesses, whereby the stays 161 might be removably attached to the level pipe by means of a resilient ring 165.

An annular bulge on the inside of the filling pipe 151 and adapted to co-operate with the packing ring 156 has been designated 153.

How the device shown in FIG. 13 and above described is intended to work, should not require any further explanation, as the method of working in its essential respects is analogous to the previous embodiment. The valve construction according to FIG. 13, however, is yet easier to clean, which should not require any closer motivation. Further, which is an essential feature from a level regulation point of view, the discharge openings 154 have not such a placing that any risk does not occur for an ejector influence from the liquid pouring through the filling pipe.

That which is claimed is:

1. A method of maintaining sterile conditions in a packaging machine of the type which forms a web of paper into a tube and which uses a filling pipe to fill the tube and a level pipe to sense the level of sterile liquid in the tube comprising the steps of supplying sterile liquid to said filling pipe, supplying sterile liquid to said tube from said filling pipe, sensing the level of liquid in said level pipe to provide relative movement between said filling pipe and said lever pipe to shut off the supply of said sterile liquid to said tube and providing further relative movement between said filling pipe and said level pipe to circulate sterile liquid from said filling pipe to said level pipe.

2. The method of claim 1 wherein a gas pressure is maintained in said level pipe when said fill pipe is supplying sterile liquid to said tube.

3. Apparatus to fill a tube of material with a sterile liquid comprising: a tube of material, a supply of sterile liquid, a fill pipe in said tube of material to supply sterile liquid from said supply to said fill pipe, a second pipe projecting into the sterile liquid in said tube, means sensing the level of liquid in said second pipe to change the relative displacement of said fill pipe to said second pipe, and valve means operably associated with said fill pipe and said second pipe to completely shut off said fill pipe in one position and allow communication between said tube and said sterile liquid in said tube and to provide recirculation between said fill pipe and said second pipe in a second position.

4. The structure of claim 2 wherein means are provided to pressurize said second pipe.

5. The structure of claim 3 wherein said fill pipe and second pipe are coaxial.

6. The structure of claim 5 wherein said fill pipe surrounds said second pipe.

7. The structure of claim 6 wherein said second pipe surrounds said fill pipe.

8. The structure of claim 7 wherein said valve means includes a bottom plate, said bottom plate having a substantially smooth surface, one of said pipes engaging said bottom plate when said valve means is in the position where said sterile liquid is passing from fill pipe to said second pipe thereby by-passing said tube.

9. The structure of claim 8 wherein said valve means includes a sealing member, said fill pipe having a bulge on the inner surface thereof, said sealing member engaging said bulge to close said fill pipe.

10. The structure of claim 9 wherein said sealing member is connected to said bottom plate.

References Cited

FOREIGN PATENTS 1,146,394  3/1963  Germany.

HOUSTON S. BELL, Jr., Primary Examiner

U.S. Cl. X.R.

141—102, 198, 302, 392; 222—318